No. 707,728. Patented Aug. 26, 1902.
R. SCHULZ.
OIL SEPARATOR.
(Application filed Sept. 7, 1901.)
(No Model.)

Witnesses:
Inventor.
Richard Schulz.

UNITED STATES PATENT OFFICE.

RICHARD SCHULZ, OF BERLIN, GERMANY.

OIL-SEPARATOR.

SPECIFICATION forming part of Letters Patent No. 707,728, dated August 26, 1902.

Application filed September 7, 1901. Serial No. 74,672. (No model.)

*To all whom it may concern:*

Be it known that I, RICHARD SCHULZ, a subject of the King of Prussia, German Emperor, residing at Berlin, in the Empire of Germany, have invented certain new and useful Improvements in Oil-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to oil-separators designed to be placed in steam-conduits to separate the oil contained in the steam during its passage through the conduit, and has for its object to provide an economical, easily removable, and adjustable separator effective in its operation.

Figure 1:
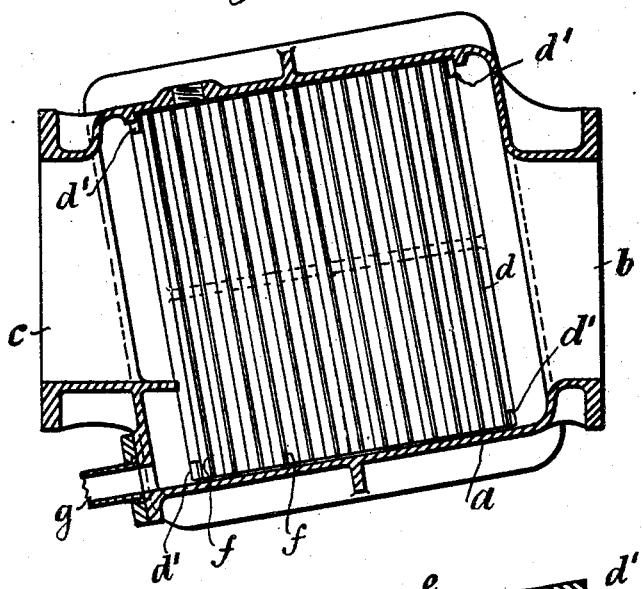
Figure 2:
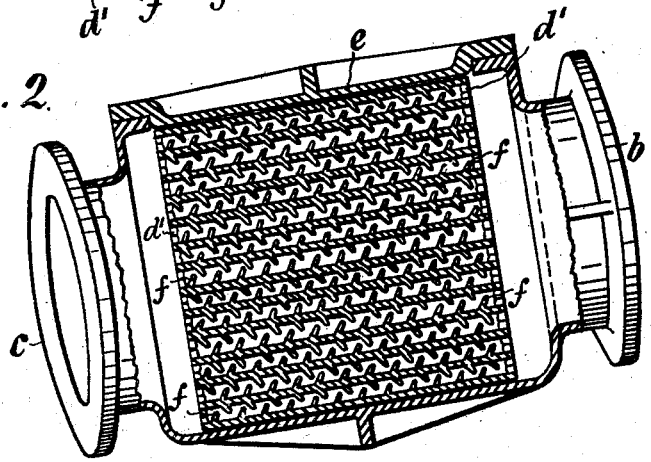

Referring to the drawings, in which like parts are similarly designated, Figure 1 is a vertical section; and Fig. 2 is a horizontal section, partly in plan.

The device consists of a casing $a$, provided with an inlet steam-union $b$ and an outlet steam-union $c$, by means of which it is inserted in the steam-pipe or other conduit. The casing $a$ is provided with a movable cover $e$ at one side and has at its lower portion an outlet-pipe $g$. The casing has a slightly larger cross-section than that of the steam pipe or passage and is arranged to have inserted in it a series of plates $d$. Each plate is provided with inclined ribs $f$ on each side, said ribs being arranged to loosely interfit with those on the adjoining plate, so as to provide a tortuous or zigzag passage for the steam between the plates. These ribs are inclined toward the incoming steam, and the friction of the steam against the plates and ribs will cause the oil to adhere to them and run down toward the bottom of the substantially rectangular chamber $a$, where, together with any condensation-water, it can be drawn off through the pipe $g$, which is provided with a suitable stop-cock. (Not shown.) As shown in Fig. 1, the plates are preferably, though not necessarily, somewhat inclined and are normal to the inclined bottom of the rectangular chamber $a$. Said chamber has its lower end somewhat below the steam-outlet union $c$, and below this union at the lowest point enters the draw-off pipe $g$. The plates are suitably spaced from one another in any desirable manner, as by means of spacing-beads $d'$, formed on or separate from the plates and by varying the spacing between the plates, a greater or less number of these can be inserted, thereby providing a larger or smaller friction-surface. The entire series of plates $d$ are held in position between the lid $e$ and the wall of the casing $a$ opposite to the lid. By reason of the ribs $f$ being inclined in the direction of the incoming steam they form substantially separating-pockets, causing the eddying of the steam and effective separation of the oil and the priming-water, if any.

It is of course obvious that should it be desired to reverse the direction of the steam through the oil-separator this may be done.

It will be observed by the structure here shown a very thin plate may be used, the separator-ribs $f$ aiding very materially to strengthen these plates against distortion by steam-pressure, thus providing a more compact separator than those heretofore constructed.

Having thus described my invention, what I claim as new therein, and desire to secure by Letters Patent, is—

An oil-separator, comprising a substantially rectangular chamber adapted to be inserted in a steam-conduit so that its longitudinal axis will be inclined thereto, vertical plates therein, straight ribs on said plates inclined in the direction of the entering steam and extending from top to bottom of said chamber, the ribs of adjacent plates overlapping to direct steam in thin sheets in a zigzag manner along opposite sides of the plates and from end to end of said chamber and to deposit oil in the reëntrant angles formed by said ribs, an entering and exit union to said chamber, the latter above the inclined bottom of the chamber, and means to draw off the separated oil below said union and from between the plates, substantially as set forth.

In testimony that I claim the foregoing as my invention I have signed my name in presence of two subscribing witnesses.

RICHARD SCHULZ.

Witnesses:
OTTO LAN,
EMIL SCHNEEKLOTH.